US009695298B2

(12) United States Patent
Sakata et al.

(10) Patent No.: US 9,695,298 B2
(45) Date of Patent: Jul. 4, 2017

(54) CHLOROSULFONATED POLYETHYLENE LATEX

(75) Inventors: Jun Sakata, Himeji (JP); Hiromasa Miyazaki, Himeji (JP); Taiji Matsukawa, Himeji (JP)

(73) Assignee: SUMITOMO SEIKA CHEMICALS CO., LTD., KAKO-GUN (JP)

( * ) Notice: Subject to any disclaimer, the term of this patent is extended or adjusted under 35 U.S.C. 154(b) by 580 days.

(21) Appl. No.: 14/111,059

(22) PCT Filed: Apr. 2, 2012

(86) PCT No.: PCT/JP2012/058846
§ 371 (c)(1),
(2), (4) Date: Oct. 10, 2013

(87) PCT Pub. No.: WO2012/141020
PCT Pub. Date: Oct. 18, 2012

(65) Prior Publication Data
US 2014/0031464 A1    Jan. 30, 2014

(30) Foreign Application Priority Data
Apr. 11, 2011  (JP) .................................. 2011-087376

(51) Int. Cl.
| | |
|---|---|
| *C08K 5/41* | (2006.01) |
| *C08J 3/05* | (2006.01) |
| *C08K 5/09* | (2006.01) |
| *C08L 23/34* | (2006.01) |
| *C08L 71/02* | (2006.01) |
| *C09D 123/34* | (2006.01) |
| *C09J 11/08* | (2006.01) |
| *C09J 123/34* | (2006.01) |
| *C08K 5/098* | (2006.01) |

(52) U.S. Cl.
CPC ........ *C08K 5/41* (2013.01); *C08J 3/05* (2013.01); *C08K 5/09* (2013.01); *C08K 5/098* (2013.01); *C08L 23/34* (2013.01); *C08L 71/02* (2013.01); *C09D 123/34* (2013.01); *C09J 11/08* (2013.01); *C09J 123/34* (2013.01); *C08J 2323/34* (2013.01)

(58) Field of Classification Search
CPC ......... C08L 23/34; C08L 71/02; C09J 123/34; C08K 5/41; C08K 5/098; C08K 5/09; C08J 3/05; C08J 11/08; C08J 2323/34; C09D 123/34

USPC ........................................................ 524/156
See application file for complete search history.

(56) References Cited

U.S. PATENT DOCUMENTS

| | | | |
|---|---|---|---|
| 5,368,928 A | 11/1994 | Okamura et al. | |
| 2009/0286933 A1* | 11/2009 | Nagaishi .................. | C09D 5/02 524/832 |

FOREIGN PATENT DOCUMENTS

| | | |
|---|---|---|
| CN | 1468920 A | 1/2004 |
| CN | 101033434 A | 9/2007 |
| JP | 43-23763 B1 | 10/1968 |
| JP | 49-97078 A | 9/1974 |
| JP | 58-138734 A | 8/1983 |
| JP | 59-145232 A | 8/1984 |
| JP | 61-51042 A | 3/1986 |
| JP | 5-339881 A | 12/1993 |
| JP | 2007-224244 A | 9/2007 |
| JP | 2008-127436 A | 6/2008 |

OTHER PUBLICATIONS

English Language Macine Translation of JP 2007-224244, Sep. 6, 2007.*
Extended European Search Report issued Feb. 2, 2015, in European Patent Application No. 12770632.3.
Search Report issued Apr. 1, 2015, in Chinese Patent Application No. 2012800178817.
International Preliminary Report on Patentability, and Translation of Written Opinion of the International Searching Authority, dated Oct. 15, 2013, for International Application No. PCT/JP2012/058846 (Forms PCT/IB/373 and PCT/ISA/237).
International Search Report dated Jun. 26, 2012 for International Application No. PCT/JP2012/058846.

* cited by examiner

*Primary Examiner* — Angela C Scott
(74) *Attorney, Agent, or Firm* — Birch, Stewart, Kolasch & Birch, LLP

(57) ABSTRACT

A chlorosulfonated polyethylene latex, which is safe for living bodies and the environment and can be used as a latex component in a resorcin-formalin-latex adhesive, contains an aqueous dispersion medium, chlorosulfonated polyethylene, and an emulsifying agent of a polyoxyalkylene alkyl ether sulfate of formula (I) below and a fatty acid salt. The latex is excellent in standing stability and mechanical stability. In formula (I), $R^1$, $R^2$, n, and M represent an alkyl group of 6 to 20 carbon atoms, hydrogen or a methyl group, an integer of 2 to 40, and an alkali metal, respectively.

$$R^1\text{—O—}(CH_2CHR^2\text{—O})_n\text{—}SO_3M \qquad (I)$$

12 Claims, No Drawings

CHLOROSULFONATED POLYETHYLENE LATEX

TECHNICAL FIELD

The present invention relates to a latex, in particular, to a chlorosulfonated polyethylene latex.

BACKGROUND ART

Chlorosulfonated polyethylene can form films with a high level of heat resistance, weather resistance, ozone resistance, chemical resistance, abrasion resistance, bending fatigue resistance and other properties, and is hence often used in the form of a latex for coating materials and adhesive materials. For example, a chlorosulfonated polyethylene latex is used as a latex component to form a resorcin-formalin-latex adhesive (hereinafter also referred to as an "RFL adhesive"), and timing belts for use in automobiles are produced using such a resorcin-formalin-latex adhesive, in which a matrix rubber, such as ethylene-propylene-diene rubber (EPDM) or hydrogenated acrylonitrile butadiene rubber (HNBR), and reinforcing fibers, such as polyamide resin fibers or glass fibers, are bonded together with the adhesive to form a composite with higher strength.

In view of standing stability or RFL adhesive strength, chlorosulfonated polyethylene latexes for use in RFL adhesives and the like have been usually prepared using a polyoxyethylene alkyl phenyl ether sulfate as an emulsifying agent (see, for example, Patent Literatures 1 and 2). However, latexes prepared using such an emulsifying agent raise the problem of retention of an alkyl phenol ether compound suspected of being an endocrine disruptor, and the use of such latexes are now being regulated for the safety of living bodies and the environment.

Other known examples of emulsifying agents for use in the production of chlorosulfonated polyethylene latexes include salts of fatty acids such as oleic acid and stearic acid, organic sulfates such as sodium lauryl sulfate and sodium higher alcohol sulfate, and organic sulfonates such as sodium dodecylbenzene sulfonate and sodium alkylnaphthalene sulfonate (see, for example, Patent Literature 3). However, chlorosulfonated polyethylene latexes prepared using these emulsifying agents are inferior in standing stability or mechanical stability to those prepared using a polyoxyethylene alkyl phenyl ether sulfate, and are also difficult to increase the adhesive strength of RFL adhesives even when used in RFL adhesives.

PRIOR ART LITERATURES

Patent Literatures

Patent Literature 1: Japanese Patent Application Laid-Open No. 58-138734
Patent Literature 2: Japanese Patent Application Laid-Open No. 61-51042
Patent Literature 3: Japanese Patent Application Laid-Open No. 2007-224244

SUMMARY OF THE INVENTION

Problems to be Solved by the Invention

An object of the present invention is to have a chlorosulfonated polyethylene latex improved in safety for living bodies and the environment, also in the level of standing stability and mechanical stability, and further in conserving the adhesive strength of an RFL adhesive when used to form the RFL adhesive.

Means for Solving the Problems

The invention is directed to a chlorosulfonated polyethylene latex, which contains an aqueous dispersion medium, chlorosulfonated polyethylene, a polyoxyalkylene alkyl ether sulfate represented by formula (I) below, and a fatty acid salt.

[Chem. 1]

$$R^1-O-(CH_2CHR^2-O)_n-SO_3M \qquad (I)$$

In formula (I), $R^1$ represents an alkyl group of 6 to 20 carbon atoms, $R^2$ represents hydrogen or a methyl group, n represents an integer of 2 to 40, and M represents an alkali metal.

The chlorosulfonated polyethylene latex preferably contains 0.3 to 12 parts by mass of the polyoxyalkylene alkyl ether sulfate and 0.1 to 2.5 parts by mass of the fatty acid salt, relative to 100 parts by mass of the chlorosulfonated polyethylene.

The chlorosulfonated polyethylene latex of the present invention may further contain polyvinylpyrrolidone. In this case, the chlorosulfonated polyethylene latex preferably contains 0.3 to 12 parts by mass of the polyoxyalkylene alkyl ether sulfate, 0.1 to 2.5 parts by mass of the fatty acid salt and 0.01 to 10 parts by weight of the polyvinylpyrrolidone, relative to 100 parts by mass of the chlorosulfonated polyethylene.

An example of the polyoxyalkylene alkyl ether sulfate used in the present invention is at least one selected from the group consisting of sodium polyoxyethylene lauryl ether sulfate, sodium polyoxyethylene tridecyl ether sulfate, sodium polyoxyethylene myristyl ether sulfate, sodium polyoxypropylene lauryl ether sulfate, sodium polyoxypropylene tridecyl ether sulfate, sodium polyoxyethylene polyoxypropylene lauryl ether sulfate and sodium polyoxyethylene polyoxypropylene tridecyl ether sulfate.

Another example of the polyoxyalkylene alkyl ether sulfate used in the present invention includes a polyoxyalkylene alkyl ether sulfate (A) of formula (I) in which n represents an integer of 9 to 35 and a polyoxyalkylene alkyl ether sulfate (B) of formula (I) in which n represents an integer of 2 to 8. In this case, the polyoxyalkylene alkyl ether sulfate preferably includes 0.1 to 5 parts by mass of the polyoxyalkylene alkyl ether sulfate (B), relative to 1 part by mass of the polyoxyalkylene alkyl ether sulfate (A).

The fatty acid salt used in the present invention may be an oleic acid salt.

The polyvinylpyrrolidone used in the present invention preferably has a mass-average molecular weight of 10,000 to 5,000,000.

The chlorosulfonated polyethylene latex of the present invention contains the specified polyoxyalkylene alkyl ether sulfate and a fatty acid salt. Thus, the chlorosulfonated polyethylene latex of the present invention is safer for living bodies and the environment than latexes produced using, as an emulsifying agent, a polyoxyethylene alkyl phenyl ether sulfate suspected of having an endocrine disrupting effect, and also has a satisfactory level of standing stability and mechanical stability. In addition, the chlorosulfonated polyethylene latex of the present invention is less likely to cause a reduction in the adhesive strength of an RFL adhesive even when used as a latex component to form the RFL adhesive.

Another aspect of the present invention is directed to a method for producing a chlorosulfonated polyethylene latex, which includes the steps of dispersing chlorosulfonated polyethylene dissolved in an organic solvent in an aqueous dispersion medium in the presence of a polyoxyalkylene alkyl ether sulfate represented by the above formula (I) and a fatty acid salt to form an emulsion, and removing the organic solvent from the emulsion.

The production method may further include the step of concentrating the emulsion using a filtration membrane after removing the organic solvent.

In the production method of the present invention, 0.3 to 12 parts by mass of the polyoxyalkylene alkyl ether sulfate and 0.1 to 2.5 parts by mass of the fatty acid salt are preferably used, relative to 100 parts by mass of the chlorosulfonated polyethylene.

The chlorosulfonated polyethylene latex-producing method according to the present invention, which uses the specified polyoxyalkylene alkyl ether sulfate and a fatty acid salt, makes it possible to produce the chlorosulfonated polyethylene latex of the present invention.

A further aspect of the present invention is directed to an emulsifying agent for chlorosulfonated polyethylene, which contains a first agent containing a polyoxyalkylene alkyl ether sulfate represented by the above formula (I) and a second agent containing a fatty acid salt.

The emulsifying agent of the present invention for chlorosulfonated polyethylene is useful for producing the chlorosulfonated polyethylene latex of the present invention, as it contains a first agent containing the specified polyoxyalkylene alkyl ether sulfate and a second agent containing a fatty acid salt.

A further aspect of the present invention is directed to a resorcin-formalin-latex adhesive, which contains the chlorosulfonated polyethylene latex as a latex component.

The resorcin-formalin-latex adhesive of the present invention is safe for living bodies and the environment and also has a satisfactory level of standing stability, mechanical stability and adhesive strength, as it contains the chlorosulfonated polyethylene latex of the present invention as a latex component.

A further aspect of the present invention is directed to a molded article, which is produced using the chlorosulfonated polyethylene latex of the present invention as a raw material.

Other objects and results of the present invention will be described in the following detailed description.

EMBODIMENTS OF THE INVENTION

The chlorosulfonated polyethylene latex of the present invention contains an aqueous dispersion medium, chlorosulfonated polyethylene, a polyoxyalkylene alkyl ether sulfate and a fatty acid salt.

The aqueous dispersion medium used herein may be one commonly used for a latex, such as city water or deionized water.

Commercially available chlorosulfonated polyethylene may be used for the latex of the present invention. Examples of the commercially available product include "Hypalon", trade name of DuPont-Dow Elastomers Japan Ltd., and "TOSO-CSM", trade name of TOSOH CORPORATION. The chlorosulfonated polyethylene to be used may be produced by known methods. For example, the chlorosulfonated polyethylene can be produced in the form of a powder by a process including dissolving polyethylene in carbon tetrachloride to form a solution, exposing the solution to a mixture of chlorine gas and sulfur dioxide at high temperature and high pressure, and then removing the carbon tetrachloride from the reaction system.

The chlorosulfonated polyethylene preferably has a mass-average molecular weight of 50,000 to 300,000, more preferably 100,000 to 180,000. The chlorosulfonated polyethylene preferably has a chlorine content of 20 to 50% by mass, more preferably 20 to 30% by mass. The chlorosulfonated polyethylene preferably has a sulfur content of 0.5 to 2.0% by mass, more preferably 0.8 to 1.5% by mass. Two or more types of the chlorosulfonated polyethylene having different mass-average molecular weights, chlorine contents or sulfur contents may be used in combination.

The above preferred ranges of the mass-average molecular weight, chlorine content and sulfur content of the chlorosulfonated polyethylene are such that the chlorosulfonated polyethylene latex of the present invention is intended to be used as a latex component in an RFL adhesive. Setting the value in each range stated above makes it possible to obtain an RFL adhesive with satisfactory adhesive strength.

The polyoxyalkylene alkyl ether sulfate to be used for the latex of the present invention is represented by formula (I) below.

[Chem. 2]

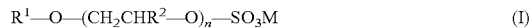

$$R^1-O-(CH_2CHR^2-O)_n-SO_3M \quad (I)$$

In formula (I), $R^1$ represents an alkyl group of 6 to 20 carbon atoms. If the number of carbon atoms in $R^1$ is less than 6, the hydrophilicity of the polyoxyalkylene alkyl ether sulfate can be too high, so that an RFL adhesive prepared using a chlorosulfonated polyethylene latex obtained with the polyoxyalkylene alkyl ether sulfate can have lower adhesive strength. On the other hand, if the number of carbon atoms in $R^1$ is more than 20, the polyoxyalkylene alkyl ether sulfate can have lower solubility in water, which can reduce the dispersion stability of the latex.

$R^2$ represents hydrogen or a methyl group. The letter n represents the addition molar number of alkylene oxide and an integer of 2 to 40, preferably an integer of 2 to 35. If n is less than 2, the polyoxyalkylene alkyl ether sulfate can easily foam, and thus be difficult to handle. If n is more than 40, an RFL adhesive prepared using a chlorosulfonated polyethylene latex obtained with the polyoxyalkylene alkyl ether sulfate may cause sliminess on a reinforcing fiber fabric or the like when applied thereto, so that the quality of the product may be impaired. M represents an alkali metal, and may be sodium or potassium.

In formula (I), the polyoxyalkylene unit represented by $(CH_2CHR^2-O)n$ may include two polyoxyalkylene moieties having different $R^2$, specifically polyoxyethylene $((CH_2CH_2-O)x)$ and polyoxypropylene $((CH_2CH(CH_3)-O)y)$ moieties, wherein the sum of x and y is n.

Examples of the polyoxyalkylene alkyl ether sulfate represented by formula (I) include polyoxyethylene alkyl ether sulfates such as sodium polyoxyethylene lauryl ether sulfate, sodium polyoxyethylene tridecyl ether sulfate, sodium polyoxyethylene myristyl ether sulfate and sodium polyoxyethylene oleyl ether sulfate, polyoxypropylene alkyl ether sulfates such as sodium polyoxypropylene lauryl ether sulfate, sodium polyoxypropylene tridecyl ether sulfate, sodium polyoxypropylene myristyl ether sulfate and sodium polyoxypropylene oleyl ether sulfate, and polyoxyethylene polyoxypropylene alkyl ether sulfates such as sodium polyoxyethylene polyoxypropylene lauryl ether sulfate and sodium polyoxyethylene polyoxypropylene tridecyl ether sulfate. Among them, at least one selected from the group consisting of sodium polyoxyethylene lauryl ether sulfate, sodium polyoxyethylene tridecyl ether sulfate, sodium polyoxyethylene myristyl ether sulfate, sodium polyoxypropylene lauryl ether sulfate, sodium polyoxypropylene tridecyl ether sulfate, sodium polyoxyethylene polyoxypropylene lauryl ether sulfate and sodium polyoxyethylene polyoxypropylene tridecyl ether sulfate is preferably used.

The polyoxyalkylene alkyl ether sulfates represented by formula (I) may be used singly or in combination of two or more. When one polyoxyalkylene alkyl ether sulfate is used, the use of the polyoxyalkylene alkyl ether sulfate of formula (I) in which n is an integer of 2 to 20 is particularly preferred. When two or more polyoxyalkylene alkyl ether sulfates are used in combination, a polyoxyalkylene alkyl ether sulfate (A) of formula (I) in which n is an integer of 9 to 35 is preferably used in combination with a polyoxyalkylene alkyl ether sulfate (B) of formula (I) in which n is an integer of 2 to 8. The polyoxyalkylene alkyl ether sulfates (A) and (B) are preferably so selected that the difference between the numbers represented by n in formula (I) is 8 to 30, more preferably 10 to 20. When they are so selected that the difference between the numbers represented by n is 8 or more and 30 or less, the chlorosulfonated polyethylene latex can have a higher level of standing stability and mechanical stability and can also form an RFL adhesive with higher adhesive strength.

When the polyoxyalkylene alkyl ether sulfates (A) and (B) are used in combination, the content of the polyoxyalkylene alkyl ether sulfate (B) in the polyoxyalkylene alkyl ether sulfate is preferably 0.1 to 5 parts by mass, more preferably 0.3 to 3 parts by mass, relative to 1 part by mass of the polyoxyalkylene alkyl ether sulfate (A). When the ratio between the polyoxyalkylene alkyl ether sulfates (A) and (B) is set in this manner, the chlorosulfonated polyethylene latex can have a higher level of standing stability and mechanical stability and can also form an RFL adhesive with higher adhesive strength.

The content of the polyoxyalkylene alkyl ether sulfate in the chlorosulfonated polyethylene latex is preferably 0.3 to 12 parts by mass, more preferably 3 to 8 parts by mass, relative to 100 parts by mass of the chlorosulfonated polyethylene. If the content of the polyoxyalkylene alkyl ether sulfate is less than 0.3 parts by mass, the chlorosulfonated polyethylene latex may have a lower level of standing stability or mechanical stability. On the other hand, if the content is more than 12 parts by mass, an RFL adhesive produced using the chlorosulfonated polyethylene latex may have lower adhesive strength.

The fatty acid salt to be used for the latex of the present invention may be of any type. In general, the fatty acid salt is preferably represented by formula (II) below.

[Chem. 3]

$$R^3COOM \qquad (II)$$

In formula (II), $R^3$ represents an alkyl group of 5 to 24 carbon atoms, and M represents sodium, potassium, ammonia or amine. Examples of such a preferred fatty acid salt include oleic acid salts, stearic acid salts, lauric acid salts, myristic acid salts and palmitic acid salts. Among them, oleic acid salts are particularly preferred because they can improve the standing stability or mechanical stability of the chlorosulfonated polyethylene latex and can also improve the adhesive strength of an RFL adhesive produced using the chlorosulfonated polyethylene latex.

The fatty acid salt is preferably used in an amount of 0.1 to 2.5 parts by mass, more preferably 0.4 to 1.5 parts by mass, relative to 100 parts by mass of the chlorosulfonated polyethylene. If the fatty acid salt is used in an amount of less than 0.1 parts by mass, the chlorosulfonated polyethylene latex may have a lower level of standing stability. On the other hand, if it is used in an amount of more than 2.5 parts by mass, an RFL adhesive produced using the chlorosulfonated polyethylene latex may have lower adhesive strength.

Although the polyoxyalkylene alkyl ether sulfate and the fatty acid salt may be used in any ratio in the chlorosulfonated polyethylene latex of the present invention, the mass content of the polyoxyalkylene alkyl ether sulfate is preferably 3 to 15 times, more preferably 3.5 to 12 times higher than that of the fatty acid salt. If the mass content of the polyoxyalkylene alkyl ether sulfate is less than 3 times or more than 15 times that of the fatty acid salt, the chlorosulfonated polyethylene latex may have a lower level of standing stability or mechanical stability, and an RFL adhesive produced using the chlorosulfonated polyethylene latex may have lower adhesive strength.

In the chlorosulfonated polyethylene latex of the present invention, the chlorosulfonated polyethylene preferably has an average particle size of 5 μm or less, more preferably 0.1 to 1.5 μm. If the chlorosulfonated polyethylene has an average particle size of more than 5 μm, precipitation of the particles may occur at higher rate to reduce standing stability. In this case, mechanical stability of the latex may also be impaired, so that an operational failure such as aggregation-induced clogging may occur during transfer using a pump. If the average particle size is less than 0.1 μm, the viscosity of the latex may be too high so that handling of the latex may be difficult.

The chlorosulfonated polyethylene latex of the present invention can be generally produced by a process including the step A of dispersing chlorosulfonated polyethylene dissolved in an organic solvent in an aqueous dispersion medium in the presence of a polyoxyalkylene alkyl ether sulfate represented by formula (I) and a fatty acid salt to form an emulsion, and the step B of removing the organic solvent from the emulsion.

Examples of the organic solvent for dissolving the chlorosulfonated polyethylene in the step A include, but are not limited to, aliphatic hydrocarbon organic solvents such as hexane and heptane, alicyclic hydrocarbon organic solvents such as cyclohexane, aromatic hydrocarbon organic solvents such as benzene, toluene and xylene, chlorinated hydrocarbon organic solvents such as chloroform and 1,2-dichloroethane, and alcoholic organic solvents such as methanol, ethanol, isopropyl alcohol and tert-butanol. These organic solvents may be used alone or in combination of two or more.

Although the organic solvent may be used in any amount, the concentration of the chlorosulfonated polyethylene in the organic solvent solution is preferably 3 to 20% by mass, more preferably 12 to 16% by mass. If the concentration of the chlorosulfonated polyethylene in the organic solvent solution exceeds 20% by mass, it can be difficult to uniformly dissolve the chlorosulfonated polyethylene, and thus the stability of the emulsion can decrease, so that the chlorosulfonated polyethylene particles in the desired latex may increase in size due to aggregation. This is more likely to occur as the emulsion, from which the organic solvent is to be removed in the step B, becomes more unstable. On the other hand, if the concentration of the chlorosulfonated polyethylene is less than 3% by mass, the organic solvent would merely have a higher content without being effective in improving the stability of the emulsion, which is not economical.

To improve the stability of the emulsion, the concentration of the chlorosulfonated polyethylene in the organic solvent solution is preferably set as low as possible. In view of keeping the organic solvent content low and enhancing economic efficiency, however, the concentration of the chlorosulfonated polyethylene is preferably set as high as possible within the above preferred range.

In general, the temperature at which the organic solvent solution of the chlorosulfonated polyethylene is prepared is preferably controlled to 100° C. or lower, which is however non-limiting.

A first mode of the step A includes dissolving the polyoxyalkylene alkyl ether sulfate represented by formula (I) and the fatty acid salt in an aqueous dispersion medium, and adding and dispersing an organic solvent solution of the chlorosulfonated polyethylene into the aqueous dispersion medium to form an emulsion. The aqueous dispersion medium used herein may be city water, deionized water or the like as mentioned above. The polyoxyalkylene alkyl ether sulfate and the fatty acid salt used in this mode are generally provided in the form of an emulsifying agent containing a first agent containing the polyoxyalkylene alkyl ether sulfate and a second agent containing the fatty acid salt. The first and second agents for this emulsifying agent may be separately added to the aqueous dispersion medium, or the first and second agents may be mixed and then added to the aqueous dispersion medium.

A second mode of the step A includes dissolving a fatty acid in the organic solvent solution of the chlorosulfonated polyethylene and then adding and dispersing the organic solvent solution into an aqueous dispersion medium in which the polyoxyalkylene alkyl ether sulfate represented by formula (I) and a neutralizer for the fatty acid are dissolved, so that an emulsion is formed. The fatty acid usable in this mode corresponds to the fatty acid salt represented by formula (II) in which M is hydrogen. The neutralizer usable in this mode is capable of forming the fatty acid salt represented by formula (II) by reacting with the fatty acid. For example, the neutralizer may be selected from sodium hydroxide, potassium hydroxide, ammonia water, alkanolamine, alkylamine, morpholine and the like, depending on M in formula (II).

In the step A, the aqueous dispersion medium may be used in any amount. In the first mode, the total concentration of the polyoxyalkylene alkyl ether sulfate and the fatty acid salt in the aqueous dispersion medium is preferably set to be 0.1 to 50% by mass, by adjusting the usage of the aqueous dispersion medium. In the second mode, the total of the concentration of the polyoxyalkylene alkyl ether sulfate in the aqueous dispersion medium and the concentration of the fatty acid salt formed by the fatty acid in the organic solvent solution and the neutralizer in the aqueous dispersion medium is preferably set to be 0.1 to 50% by mass, based on the mass of the aqueous dispersion medium, by adjusting the usage of the aqueous dispersion medium.

In the first mode, the polyoxyalkylene alkyl ether sulfate represented by formula (I) and the fatty acid salt are preferably used in amounts of 0.3 to 12 parts by mass and 0.1 to 2.5 parts by mass, respectively, relative to 100 parts by mass of the chlorosulfonated polyethylene dissolved in the organic solvent. In the second mode, the polyoxyalkylene alkyl ether sulfate represented by formula (I) is preferably used in the same amount as in the first mode. The fatty acid and the neutralizer are preferably used in such amounts that the amount of the fatty acid salt formed by addition of the organic solvent solution to the aqueous dispersion medium can be the same as in the first mode.

In the step A, the emulsion can be prepared using a method of stirring and mixing with an emulsifier capable of applying a suitable shearing force, such as a homogenizer or a colloid mill, or using a method of dispersing and mixing with ultrasonic disperser or the like, or using other methods. In general, the method of stirring and mixing is preferred. The temperature during the stirring and mixing is preferably, but not limited to, 5 to 70° C., more preferably 35 to 60° C. The average particle size of the chlorosulfonated polyethylene in the intended chlorosulfonated polyethylene latex can be adjusted by controlling the stirring and mixing or the ultrasonic dispersion during the preparation of the emulsion.

In the step B, a common method such as a method of heating an emulsion under reduced pressure may be used to remove the organic solvent from the emulsion obtained in the step A.

If necessary, the emulsion obtained after the removal of the organic solvent may be concentrated to the desired concentration. For example, concentration by heating, centrifugation, filtration, wet separation or the like may be mentioned as a non-limiting example of the concentration method. In particular, a concentration method using a filtration membrane is preferred because such a method does not require a lot of heat or stress to be applied to the emulsion and is less likely to impair the stability of the emulsion. Especially, a concentration method using an ultrafiltration membrane is preferred because it enables concentration process in a relatively short period of time and allows low-cost investments in facilities and easy reuse of the membrane after cleaning.

The intended chlorosulfonated polyethylene latex obtained after the step B preferably has a solid concentration of 20 to 60% by mass. If the solid concentration is less than 20% by mass, too high a water content can often make the use of the latex difficult and can also increase the volume, which can degrade the efficiency of transfer and use of the latex and thus be uneconomical. On the other hand, if the solid concentration exceeds 60% by mass, the viscosity can be so high as to make handling of the latex difficult.

In the production method described above, the chlorosulfonated polyethylene latex obtained through the first mode of the step A can have a pH of 2 to 7, so that its dispersibility may be slightly unstable. However, a neutralizer may be added to adjust the pH to 7 to 10 so that the dispersibility can be improved. In this case, any of common neutralizers may be used, such as sodium hydroxide, potassium hydroxide, calcium hydroxide, barium hydroxide, sodium carbonate and calcium oxide.

The chlorosulfonated polyethylene latex of the present invention may be used as a raw material for use in producing automobile parts, for example, timing belts, brake hoses, coatings, window frames and a variety of other molded articles such as fiber composite materials, in which the latex of the present invention is used as a latex component in an RFL adhesive or the like, as a binder material for various plastics, as a coating material or as a material for a fiber treatment agent or the like. The chlorosulfonated polyethylene latex of the present invention is particularly suitable for use as a latex component in an RFL adhesive. The RFL adhesive containing the chlorosulfonated polyethylene latex of the present invention has a higher level of safety for living bodies and the environment than conventional adhesives containing a chlorosulfonated polyethylene latex prepared using an alkylphenol ether compound suspected of being an endocrine disruptor, while it shows standing stability, mechanical stability and adhesive strength as high as or higher than those of such conventional adhesives.

The RFL adhesive containing the chlorosulfonated polyethylene latex of the present invention as a latex component may contain optional additives, such as a thickener, a tackifier, a plasticizer and a stabilizer, to improve applicability, stability and adhesive strength. Such additives may be added to the RFL adhesive after it is prepared, or may be added to the chlorosulfonated polyethylene latex in advance. Some types of additives may also be added to the organic solvent solution or the aqueous dispersion medium for use in the step A of the process of preparing the chlorosulfonated polyethylene latex. In general, additives are preferably added in the form of an aqueous solution or an aqueous dispersion of each additive or a mixture of additives.

An example of a stabilizer for use as an additive is polyvinylpyrrolidone. Polyvinylpyrrolidone, which has satisfactory compatibility with chlorosulfonated polyethylene and also has a colloid protective effect, can increase the standing stability and the mechanical stability of the chlorosulfonated polyethylene latex.

Polyvinylpyrrolidone is a polymer obtained by polymerization of monomer components including vinylpyrrolidone as the essential monomer component. Commercially available polyvinylpyrrolidone may be used. Any of various commercially-available polymer materials containing polyvinylpyrrolidone as one component may also be used as a source of polyvinylpyrrolidone. The mass-average molecular weight of polyvinylpyrrolidone for use is preferably, but not limited to, 10,000 to 5,000,000, more preferably 240,000 to 3,000,000, even more preferably 900,000 to 1,500,000 because polyvinylpyrrolidone with such a molecular weight can effectively increase the standing stability or mechanical stability of the chlorosulfonated polyethylene latex. The polyvinylpyrrolidone is preferably used in an amount of 0.01 to 10 parts by mass, more preferably 0.1 to 1.5 parts by mass, relative to 100 parts by mass of the chlorosulfonated polyethylene (when the polymer material containing polyvinylpyrrolidone is used as a source of polyvinylpyrrolidone, the amount is calculated taking into account the polyvinylpyrrolidone content of the polymer material).

EXAMPLES

Hereinafter, the present invention will be more specifically described with reference to examples and comparative examples. It will be understood that these examples and others are not intended to limit the present invention at all.

The sodium polyoxyalkylene alkyl ether sulfates used in the examples and the comparative examples described below are as follows.

<Sodium Polyoxyalkylene Alkyl Ether Sulfate (1)>

"TRAX ET-314", Trade Name of NOF CORPORATION

It is a mixture containing sodium polyoxyethylene polyoxypropylene lauryl ether sulfate of formula (I) in which $R^1$ is an alkyl group of 12 carbon atoms and n is 16 and sodium polyoxyethylene polyoxypropylene tridecyl ether sulfate of formula (I) in which $R^1$ is an alkyl group of 13 carbon atoms and n is 16, and is an aqueous solution having an active ingredient concentration of 30% by mass.

<Sodium Polyoxyalkylene Alkyl Ether Sulfate (2)>

"PERSOFT EF", Trade Name of NOF CORPORATION

It is a mixture containing sodium polyoxyethylene lauryl ether sulfate of formula (I) in which $R^1$ is an alkyl group of 12 carbon atoms and n is 3 and sodium polyoxyethylene myristyl ether sulfate of formula (I) in which $R^1$ is an alkyl group of 14 carbon atoms and n is 3, and is an aqueous solution having an active ingredient concentration of 25% by mass.

<Sodium Polyoxyalkylene Alkyl Ether Sulfate (3)>

"TRAX ET-311", Trade Name of NOF CORPORATION

It is a mixture containing sodium polyoxyethylene polyoxypropylene lauryl ether sulfate of formula (I) in which $R^1$ is an alkyl group of 12 carbon atoms and n is 11 and sodium polyoxyethylene polyoxypropylene tridecyl ether sulfate of formula (I) in which $R^1$ is an alkyl group of 13 carbon atoms and n is 11, and is an aqueous solution having an active ingredient concentration of 30% by mass.

<Sodium Polyoxyalkylene Alkyl Ether Sulfate (4)>

"TRAX ET-330", Trade Name of NOF CORPORATION

It is a mixture containing sodium polyoxyethylene polyoxypropylene lauryl ether sulfate of formula (I) in which $R^1$ is an alkyl group of 12 carbon atoms and n is 30 and sodium polyoxyethylene polyoxypropylene tridecyl ether sulfate of formula (I) in which $R^1$ is an alkyl group of 13 carbon atoms and n is 30, and is an aqueous solution having an active ingredient concentration of 30% by mass.

<Sodium Polyoxyalkylene Alkyl Ether Sulfate (5)>

"EMAL 20CM", Trade Name of Kao Corporation

It is a mixture containing sodium polyoxyethylene lauryl ether sulfate of formula (I) in which $R^1$ is an alkyl group of 12 carbon atoms and n is 3 and sodium polyoxyethylene tridecyl ether sulfate of formula (I) in which $R^1$ is an alkyl group of 13 carbon atoms and n is 3, and is an aqueous solution having an active ingredient concentration of 25% by mass.

Example 1

A separable flask with an internal volume of 500 mL was charged with 45 g of chlorosulfonated polyethylene ("Hypalon 45", trade name of DuPont-Dow Elastomers Japan Ltd., 142,000 in mass-average molecular weight, 23.5% by mass in chlorine content, 1.0% by mass in sulfur content), 255 g of toluene and 0.45 g of oleic acid. The materials charged in the flask were dissolved by stirring at 85° C. for 4 hours to form an organic solvent solution. An aqueous solution was also prepared by dissolving 7.5 g of sodium polyoxyalkylene alkyl ether sulfate (1) and 0.188 g of potassium hydroxide in 170 g of water.

The aqueous solution was added to the organic solvent solution and stirred and mixed for 10 minutes using a homo-mixer ("TK HOMO MIXER Model M", trade name of PRIMIX Corporation) to form an emulsion. In the stirring and mixing, the rotational speed and the temperature were set at 12,000 rpm and 40° C., respectively. The resulting emulsion was heated under a reduced pressure of 40 to 90 kPa at 40 to 70° C. so that toluene was removed by distillation, and was then concentrated to a solid concentration of 40% using an ultrafilter equipped with a flat-type ultrafiltration membrane having cut-off molecular weight of 200,000, so that a chlorosulfonated polyethylene latex was obtained. The solid concentration was determined by a process including drying part of the resulting latex at 130° C. for 1 hour to remove water and then measuring the mass of the residue.

Example 2

A chlorosulfonated polyethylene latex was produced using the same process as in Example 1, except that a mixture of 4.5 g of sodium polyoxyalkylene alkyl ether sulfate (1) and 3.6 g of sodium polyoxyalkylene alkyl ether sulfate (2) was used in place of 7.5 g of sodium polyoxyalkylene alkyl ether sulfate (1).

Example 3

A chlorosulfonated polyethylene latex was produced using the same process as in Example 2, except that the amounts of sodium polyoxyalkylene alkyl ether sulfate (1) and sodium polyoxyalkylene alkyl ether sulfate (2) were changed to 1.5 g and 7.2 g, respectively.

Example 4

A chlorosulfonated polyethylene latex was produced using the same process as in Example 2, except that the amounts of sodium polyoxyalkylene alkyl ether sulfate (1) and sodium polyoxyalkylene alkyl ether sulfate (2) were changed to 6.0 g and 1.8 g, respectively.

Example 5

A chlorosulfonated polyethylene latex was produced using the same process as in Example 1, except that the amount of oleic acid was changed to 0.225 g, a mixture of 7.5 g of sodium polyoxyalkylene alkyl ether sulfate (1) and 0.9 g of sodium polyoxyalkylene alkyl ether sulfate (2) was used in place of 7.5 g of sodium polyoxyalkylene alkyl ether sulfate (1), and the amount of potassium hydroxide was changed to 0.141 g.

Example 6

A chlorosulfonated polyethylene latex was produced using the same process as in Example 1, except that 9.0 g of sodium polyoxyalkylene alkyl ether sulfate (2) was used in place of 7.5 g of sodium polyoxyalkylene alkyl ether sulfate (1).

Example 7

A chlorosulfonated polyethylene latex was produced using the same process as in Example 1, except that when the aqueous solution was prepared, a mixture of 4.5 g of sodium polyoxyalkylene alkyl ether sulfate (1) and 3.6 g of sodium polyoxyalkylene alkyl ether sulfate (2) was used in place of 7.5 g of sodium polyoxyalkylene alkyl ether sulfate (1), and 0.09 g of polyvinylpyrrolidone ("PVP K-90", trade name of ISP Japan Ltd., 900,000 to 1,500,000 in mass-average molecular weight) was also dissolved in water.

Example 8

A chlorosulfonated polyethylene latex was produced using the same process as in Example 1, except that sodium polyoxyalkylene alkyl ether sulfate (3) was used in place of sodium polyoxyalkylene alkyl ether sulfate (1).

Example 9

A chlorosulfonated polyethylene latex was produced using the same process as in Example 1, except that sodium polyoxyalkylene alkyl ether sulfate (4) was used in place of sodium polyoxyalkylene alkyl ether sulfate (1).

Example 10

A chlorosulfonated polyethylene latex was produced using the same process as in Example 2, except that sodium polyoxyalkylene alkyl ether sulfate (5) was used in place of sodium polyoxyalkylene alkyl ether sulfate (2).

Example 11

A chlorosulfonated polyethylene latex was produced using the same process as in Example 2, except that the emulsion from which toluene was removed was concentrated to a solid concentration of 40% by heating at 80° C. under reduced pressure without using any ultrafilter.

Example 12

A chlorosulfonated polyethylene latex was produced using the same process as in Example 7, except that the amount of polyvinylpyrrolidone was changed to 0.025 g.

Example 13

A chlorosulfonated polyethylene latex was produced using the same process as in Example 7, except that the amount of polyvinylpyrrolidone was changed to 0.45 g.

Example 14

A chlorosulfonated polyethylene latex was produced using the same process as in Example 7, except that the amount of polyvinylpyrrolidone was changed to 0.9 g.

Example 15

A chlorosulfonated polyethylene latex was produced using the same process as in Example 7, except that polyvinylpyrrolidone of 40,000 to 80,000 in mass-average molecular weight available from ISP Japan Ltd., under the trade name of "PVP K-30" was used instead.

Example 16

A chlorosulfonated polyethylene latex was produced using the same process as in Example 7, except that polyvinylpyrrolidone of 240,000 to 450,000 in mass-average molecular weight available from ISP Japan Ltd., under the trade name of "PVP K-60" was used instead.

Example 17

A chlorosulfonated polyethylene latex was produced using the same process as in Example 7, except that polyvinylpyrrolidone of 2,000,000 to 3,000,000 in mass-average molecular weight available from ISP Japan Ltd., under the trade name of "PVP K-120" was used instead.

Example 18

A chlorosulfonated polyethylene latex was produced using the same process as in Example 1, except that the amount of oleic acid was changed to 1.35 g, the amount of sodium polyoxyalkylene alkyl ether sulfate (1) was changed to 4.5 g, and the amount of potassium hydroxide was changed to 0.376 g.

Comparative Example 1

A chlorosulfonated polyethylene latex was produced using the same process as in Example 1, except that oleic acid was not used, the amount of sodium polyoxyalkylene alkyl ether sulfate (1) was changed to 9.0 g, and the amount of potassium hydroxide was changed to 0.094 g.

Comparative Example 2

A chlorosulfonated polyethylene latex was produced using the same process as in Example 1, except that the amount of oleic acid was changed to 2.7 g, sodium polyoxyalkylene alkyl ether sulfate (1) was not used, and the amount of potassium hydroxide was changed to 0.658 g.

Comparative Example 3

A chlorosulfonated polyethylene latex was produced using the same process as in Example 1, except that 2.81 g of sodium dioctyl sulfosuccinate ("RAPISOL A-80", trade name of NOF CORPORATION, 80% by mass in active ingredient concentration) was used in place of 7.5 g of sodium polyoxyalkylene alkyl ether sulfate (1).

Evaluation

For each of the examples and the comparative examples, the emulsion prepared in the process of producing the chlorosulfonated polyethylene latex and the final resulting chlorosulfonated polyethylene latex were each measured for average particle size. The mechanical stability of the resulting chlorosulfonated polyethylene latex was also evaluated. An RFL adhesive was prepared using the chlorosulfonated polyethylene latex produced in each of the examples and the comparative examples, and its adhesive strength was evaluated. The measurement method and the evaluation method are described below. The results are shown in Table 1.

(Measurement of Average Particle Size)

The average particle sizes of the emulsion and the latex were measured using a laser diffraction particle size analyzer ("SALD-2000J", trade name of Shimadzu Corporation). In this case, the average particle size is the value determined on the assumption that if the measured particle shows the same diffraction and scattering pattern as a sphere with a diameter of 1 μm, it is assumed to have a particle size of 1 μm regardless of its shape.

(Evaluation of Mechanical Stability)

Using a Maron stability tester (manufactured by Kumagai Riki Kogyo Co., Ltd.), a load and a shearing stress by stirring were applied to each latex to generate coagulations. In this process, the load and the stirring rotation speed were 30 kg and 1,000 rpm, respectively. Ten minutes after the shearing stress was applied, the amount of coagulations was measured, and the ratio of coagulations to the weight of the total solids in the latex was calculated as the coagulation rate. It can be concluded that the lower the coagulation rate, the higher the mechanical stability. It can also be concluded that when the coagulation rate is 1% or less, the mechanical stability is excellent.

(Test 1 for Evaluation of the Adhesive Strength of RFL Adhesive)

An aqueous solution was prepared by dissolving 0.5 g of sodium hydroxide in 240 g of water, and 11 g of resorcin and 16 g of 37% formalin were mixed and dissolved into the aqueous solution. The resulting solution was stored at 30° C. for 5 hours to give a resorcin-formaldehyde resin aqueous liquid. Subsequently, 25.2 g of the resulting resorcin-formaldehyde resin aqueous liquid, 25.2 g of the chlorosulfonated polyethylene latex produced in each example or comparative example, 20.8 g of water and 0.01 g of potassium hydroxide were mixed, and the mixture was stored at 30° C. for 2 hours to form an RFL adhesive.

A Nylon 66 woven fabric (10 cm×10 cm×0.2 mm) was dipped in the resulting RFL adhesive and then heat-treated at 150° C. for 3 minutes so that the adhesive was fixed to form a rubber-reinforcing fiber fabric. The resulting rubber-reinforcing fiber fabric and the EPDM rubber sheet (10 cm×10 cm×2 mm) prepared according to the formulation shown in Table 2 were alternately laminated in five layers in such a manner that the EPDM rubber sheets were placed on both sides. The laminate was subjected to vulcanization bonding by being pressed at 160° C. for 20 minutes so that an EPDM rubber composite reinforced with the rubber-reinforcing fiber fabric was obtained. The resulting EPDM rubber composite was cut into a 25 mm-wide piece, which was measured for peel strength under the conditions of a peel speed of 50 mm/minute and a peel angle of 180 degrees using a tester ("AGS-J", trade name of Shimadzu Corporation). It can be concluded that when the peel strength is 10 kgf/25 mm or more, the adhesive strength is satisfactory and that when it is 20 kgf/25 mm or more, the adhesive strength is excellent.

(Test 2 for Evaluation of the Adhesive Strength of RFL Adhesive)

After the peel strength was measured in the evaluation test 1, the area of the rubber adhering to the surface of the rubber-reinforcing fiber fabric was visually measured, and the ratio (%) of the area of the adhering rubber to the area of the fabric was evaluated as the quantity of rubber adhesion. The larger quantity of rubber adhesion indicates the higher degree of destruction of the EPDM rubber sheet and the higher adhesive strength between the rubber-reinforcing fiber fabric and the EPDM rubber sheet. It can be concluded that when the ratio is 20% or more, the adhesive strength is satisfactory and that when it is 50% or more, the adhesive strength is excellent.

TABLE 1

| | Average particle size (μm) | | | Mechanical stability Coagulation rate (%) | Adhesive strength evaluation | |
|---|---|---|---|---|---|---|
| | | | | | Peel strength (kgf/25 mm) | Quantity of rubber adhesion (%) |
| | Emulsion | Latex | Remarks | | | |
| Example 1 | 0.94 | 1.26 | — | 0.38 | 22.4 | 60 |
| Example 2 | 0.68 | 0.78 | — | 0.24 | 30.2 | 100 |
| Example 3 | 0.78 | 0.84 | — | 0.21 | 26.4 | 80 |
| Example 4 | 0.72 | 0.82 | — | 0.23 | 27.2 | 80 |
| Example 5 | 1.02 | 1.04 | — | 0.32 | 24.6 | 70 |

TABLE 1-continued

| | Average particle size (μm) | | | Mechanical stability Coagulation | Adhesive strength evaluation | |
| | | | | | Peel strength | Quantity of rubber adhesion |
| | Emulsion | Latex | Remarks | rate (%) | (kgf/25 mm) | (%) |
|---|---|---|---|---|---|---|
| Example 6 | 0.81 | 1.20 | — | 0.42 | 23.8 | 60 |
| Example 7 | 0.60 | 0.61 | — | 0.08 | 30.3 | 100 |
| Example 8 | 0.83 | 0.92 | — | 0.22 | 26.8 | 80 |
| Example 9 | 1.24 | 1.34 | — | 0.65 | 21.0 | 50 |
| Example 10 | 0.63 | 0.68 | — | 0.20 | 30.3 | 100 |
| Example 11 | 0.68 | 0.98 | — | 0.35 | 28.6 | 90 |
| Example 12 | 0.67 | 0.68 | — | 0.17 | 30.2 | 100 |
| Example 13 | 0.58 | 0.59 | — | 0.07 | 29.6 | 100 |
| Example 14 | 0.57 | 0.58 | *1 | 0.05 | 23.8 | 60 |
| Example 15 | 0.61 | 0.62 | — | 0.22 | 30.1 | 100 |
| Example 16 | 0.61 | 0.62 | — | 0.14 | 30.2 | 100 |
| Example 17 | 0.63 | 0.64 | — | 0.12 | 30.1 | 100 |
| Example 18 | 0.78 | 0.82 | — | 0.5 | 13.2 | 20 |
| Comparative Example 1 | 1.02 | 5.22 | *2 | 5.1 | 10.2 | 10 |
| Comparative Example 2 | 1.63 | 1.63 | — | 1.4 | 5.6 | 0 |
| Comparative Example 3 | 1.22 | 9.80 | *2 | 6.0 | 11.7 | 10 |

*1: A slight increase in viscosity
*2: Particles aggregate during the concentration.

TABLE 2

| Formulation of EPDM rubber sheet (mass %) | |
|---|---|
| EPDM (*1) | 100 |
| FEF carbon black | 50 |
| Process oil | 10 |
| Zinc oxide | 5 |
| Stearic acid | 1 |
| Sulfur | 1 |
| Vulcanizing accelerator A (*2) | 1 |
| Vulcanizing accelerator B (*3) | 1 |
| Vulcanizing accelerator C (*4) | 0.5 |

(*1): "ESPLENE E501A", trade name of Sumitomo Chemical Co., Ltd.
(*2): Zinc di-n-butyldithiocarbamate ("SOXINOL BZ", trade name of Sumitomo Chemical Co., Ltd.)
(*3): Tetramethylthiuram disulfide ("NOCCELER TTP", trade name of Ouchi Shinko Chemical Industrial Co., Ltd.)
(*4): 2-Mercaptobenzothiazole ("SOXINOL M", trade name of Sumitomo Chemical Co., Ltd.)

Table 1 shows that the chlorosulfonated polyethylene latex obtained in each of Examples 1 to 18 has a high level of standing stability because of a small average particle size, and also has a high level of mechanical stability. It is also apparent that RFL adhesives produced using such latexes have satisfactory adhesive strength. In particular, a comparison between Examples 1 to 17 and Example 18 shows that when the formulation of the latex is controlled, the RFL adhesive produced using the resulting latex can have significantly high adhesive strength.

In contrast, all RFL adhesives produced using chlorosulfonated polyethylene latexes obtained in Comparative Examples 1 to 3, respectively, had an insufficient level of adhesive strength.

In Comparative Examples 1 and 3, an emulsion with a relatively small average particle size was obtained in the production of the latex, but the particles aggregated during the concentration of the emulsion, so that the average particle size increased and as a result, only latexes with an insufficient level of standing stability and mechanical stability were obtained. This is considered because the chlorosulfonyl group in the chlorosulfonated polyethylene is decomposed in the process of removing the organic solvent from the emulsion, so that the pH of the latex decreases and the emulsifying agent becomes less effective, which makes it easy for particles to aggregate.

The present invention can be carried out in other specific forms without departing from the spirit or essential properties thereof. The above embodiment and example are therefore to be considered in all respects as illustrative and not restrictive. The scope of the present invention is indicated by the appended claims rather than by the foregoing description. All changes and modifications which come within the range of equivalency of the claims are therefore intended to be included within the scope of the present invention.

The invention claimed is:

1. A chlorosulfonated polyethylene latex, comprising:
    an aqueous dispersion medium,
    chlorosulfonated polyethylene,
    0.3 to 12 parts by mass of a polyoxyalkylene alkyl ether sulfate represented by formula (I)

$$R^1-O-(CH_2CHR^2-O)_n-SO_3M \tag{I}$$

wherein $R^1$ represents an alkyl group of 6 to 20 carbon atoms, $R^2$ represents hydrogen or a methyl group, n represents an integer of 2 to 40, and M represents an alkali metal relative to 100 parts by mass of the chlorosulfonated polyethylene, and
    0.1 to 2.5 parts by mass of a fatty acid salt relative to 100 parts by mass of the chlorosulfonated polyethylene.

2. The chlorosulfonated polyethylene latex according to claim 1, further comprising polyvinylpyrrolidone.

3. The chlorosulfonated polyethylene latex according to claim 2, which comprises 0.01 to 10 parts by mass of the polyvinylpyrrolidone, relative to 100 parts by mass of the chlorosulfonated polyethylene.

4. The chlorosulfonated polyethylene latex according to claim 2, wherein the polyvinylpyrrolidone has a mass-average molecular weight of 10,000 to 5,000,000.

5. The chlorosulfonated polyethylene latex according to claim 1, wherein the polyoxyalkylene alkyl ether sulfate is at least one selected from the group consisting of sodium polyoxyethylene lauryl ether sulfate, sodium polyoxyethylene tridecyl ether sulfate, sodium polyoxyethylene myristyl ether sulfate, sodium polyoxypropylene lauryl ether sulfate, sodium polyoxypropylene tridecyl ether sulfate, sodium polyoxyethylene polyoxypropylene lauryl ether sulfate and sodium polyoxyethylene polyoxypropylene tridecyl ether sulfate.

6. The chlorosulfonated polyethylene latex according to claim 1, wherein the polyoxyalkylene alkyl ether sulfate includes a polyoxyalkylene alkyl ether sulfate (A) of formula (I) in which n represents an integer of 9 to 35 and a polyoxyalkylene alkyl ether sulfate (B) of formula (I) in which n represents an integer of 2 to 8.

7. The chlorosulfonated polyethylene latex according to claim 6, which comprises 0.1 to 5 parts by mass of the polyoxyalkylene alkyl ether sulfate (B), relative to 1 part by mass of the polyoxyalkylene alkyl ether sulfate (A).

8. The chlorosulfonated polyethylene latex according to claim 1, wherein the fatty acid salt is an oleic acid salt.

9. A resorcin-formalin-latex adhesive comprising the chlorosulfonated polyethylene latex according to claim 1 as a latex component.

10. A molded article produced using the chlorosulfonated polyethylene latex according to claim 1 as a raw material.

11. A method for producing a chlorosulfonated polyethylene latex, comprising the steps of:
dispersing chlorosulfonated polyethylene dissolved in an organic solvent in an aqueous dispersion medium in the presence of a fatty acid salt and a polyoxyalkylene alkyl ether sulfate represented by formula (I)

$$R^1\text{—O—}(CH_2CHR^2\text{—O})_n\text{—}SO_3M \quad (I)$$

wherein $R^1$ represents an alkyl group of 6 to 20 carbon atoms, $R^2$ represents hydrogen or a methyl group, n represents an integer of 2 to 40, and M represents an alkali metal, thereby forming an emulsion, and
removing the organic solvent from the emulsion,
wherein 0.3 to 12 parts by mass of the polyoxyalkylene alkyl ether sulfate and 0.1 to 2.5 parts by mass of the fatty acid salt are used, relative to 100 parts by mass of the chlorosulfonated polyethylene.

12. The method for producing a chlorosulfonated polyethylene latex according to claim 11, further comprising the step of concentrating the emulsion using a filtration membrane after removing the organic solvent.

* * * * *